No. 881,289. PATENTED MAR. 10, 1908.
C. W. BARZEE.
ROTARY SOIL DRAG.
APPLICATION FILED MAY 7, 1907.
Fig.1.
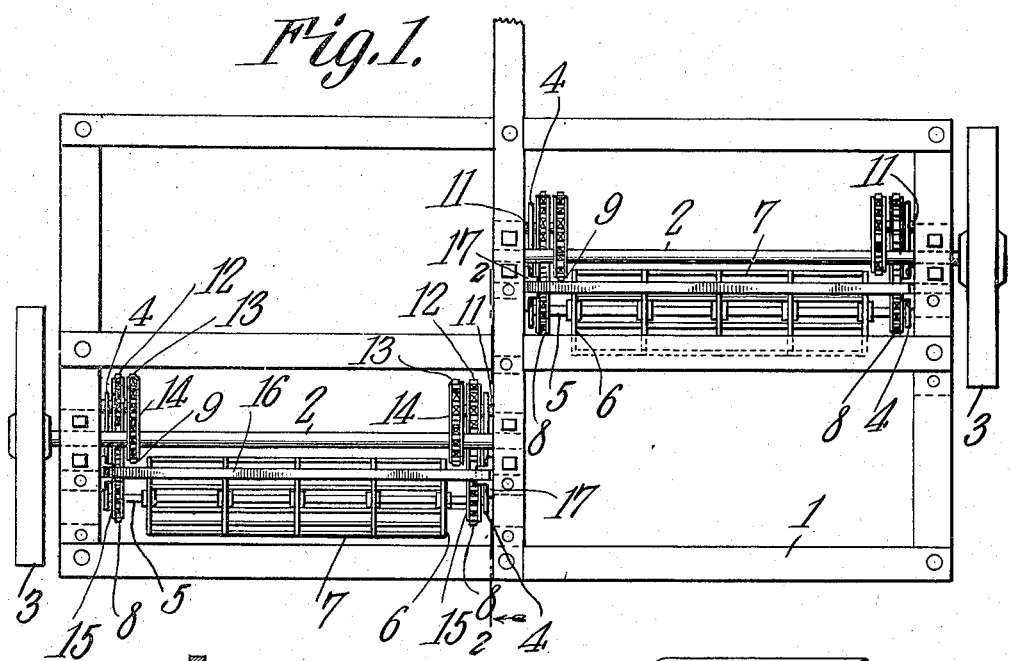
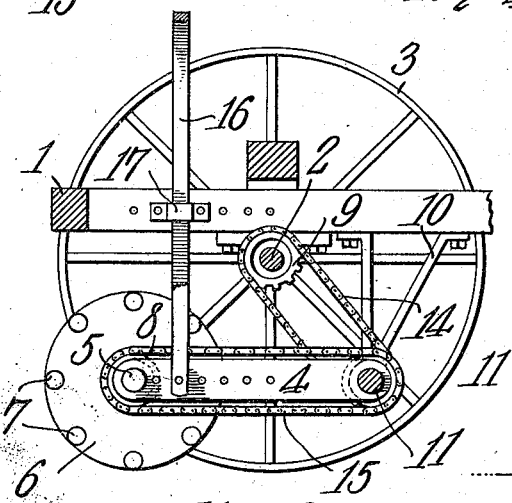
Fig.2.
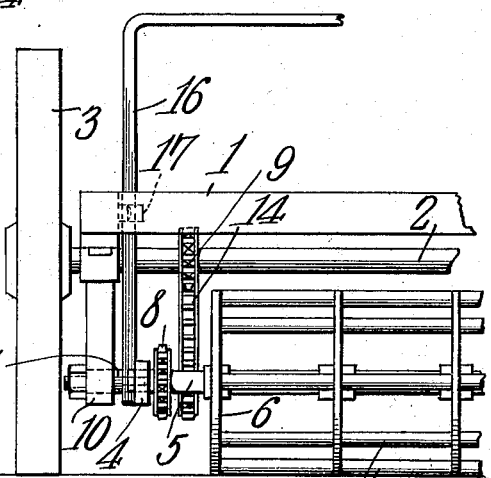
Fig.3.
WITNESSES:
Charlie W. Barzee,
INVENTOR.
By C. A. Snow & Co.
ATTORNEYS

UNITED STATES PATENT OFFICE.

CHARLIE W. BARZEE, OF THE DALLES, OREGON.

ROTARY SOIL-DRAG.

No. 881,289.  Specification of Letters Patent.  Patented March 10, 1908.

Application filed May 7, 1907. Serial No. 372,312.

*To all whom it may concern:*

Be it known that I, CHARLIE W. BARZEE, a citizen of the United States, residing at The Dalles, in the county of Wasco and State of Oregon, have invented a new and useful Rotary Soil-Drag, of which the following is a specification.

This invention has relation to implements of the character indicated and it consists in the novel construction and arrangement of its parts as hereinafter shown and described.

The object of the invention is to provide an implement which may be readily used in the capacity of either a drag, a weeder, a packer or a mulcher and it consists primarily of drums having disks connected together by rods located at the peripheries thereof and extending transversely of the same. Said drums are journaled in adjustable frames which are supported by a wheel mounted frame. Means is provided for transmitting rotary movement of the axles of the wheel mounted frame to the shafts of the drums whereby the said drums may be rotated in unison with the wheels or with their peripheries moving at a different rate of speed from that of said wheels.

In the accompanying drawing:—Figure 1 is a top plan view of the implement. Fig. 2 is a sectional view of the same cut on the line, 2—2 of Fig. 1, and Fig. 3 is a rear elevation of a portion of the implement.

The implement consists of the frame 1 which is mounted upon the axles 2. The supporting wheels 3 are fixed to the said axles which rotate with the same. The said axles are out of alinement with each other. The brackets 10 depend from the frame 1 and the stub shafts 11 are journaled in said brackets. The forward ends of the arms 4 are pivoted upon the stub shafts 11. The shafts 5 are journaled between the rear ends of the arms 4. The disks 6 are concentrically mounted upon the shafts 5 and are spaced at suitable intervals apart. The rods 7 pass transversely through the peripheries of the disks 6. Each shaft 5 is provided with the sprocket wheels 8 and each axle 2 is provided with the sprocket wheels 9. The sprocket wheels 12 and 13 are fixed to the stub shafts 11. The sprocket chains 14 pass around the sprocket wheels 9 and 13 and the sprocket chains 15 pass around the sprocket wheels 8 and 12. The bails 16 are adjustably attached at their lower ends to the arms 4 and pass through the straps 17 which are adjustably attached to the beams of the frame 1. Thus, it is possible to adjust the said bails longitudinally of the arms 4 whereby the rods 7 may be weighted more or less in the ground.

From the foregoing description it is obvious that the implement may be used as a drag, that is to say, the shafts 5 may be so geared to the axles 2 that the peripheries of the drums will rotate in the same direction as the peripheries of the wheels but at a slower rate of speed. This is due to the fact that the wheels with which the drums are operatively connected are of greater diameter than the drums. Consequently, the rods 7 will drag through the surface of the soil and disturb the entire surface thereof yet will be moving sufficiently to free themselves from weeds, stubble and similar trash. The depth at which the rods 7 will cut below the surface of the soil is in a great measure regulated by the rapidity with which the drums rotate, that is to say, if the sprocket chains were removed from the sprocket wheels the rods would work at the surface of the soil as the drums would be rotated by frictional contact with the said surface. When, however, the drums are restrained to slower rotation the said rods will cut deeper in the soil. Thus it will appear that the implement may be used as a drag-bar, a weeder, a packer and a mulcher; in as much as the rods loosen and level the surface of the soil and pass below the same forming a dust mulch.

Having described my invention what I claim as new and desire to secure by Letters-Patent is:—

An implement as described comprising a wheel mounted frame having depending brackets, arms pivotally connected with said brackets, a drum journaled for rotation between the free ends of said arms, means for transmitting rotary movement from the supporting wheel to said drum, a bail adjustably attached to the arms and guides adjustably attached to the frame and receiving the side portions of said bail.

In testimony that I claim the foregoing as my own, I have hereto affixed my signature in the presence of two witnesses.

CHARLIE W. BARZEE.

Witnesses:
SETH MORGAN,
JOHN GAVIN.